(12) United States Patent
Budzak et al.

(10) Patent No.: US 11,462,133 B2
(45) Date of Patent: Oct. 4, 2022

(54) MAGNETIC LABEL IDENTIFICATION PLATE

(71) Applicant: Whitmor, Inc., Southaven, MS (US)

(72) Inventors: Lauren Budzak, Memphis, TN (US);
James Tabujara, Memphis, TN (US);
Ashley Murphy, Hinsdale, IL (US);
Marissa Hagmeyer, Oakland Park, FL (US); Lisa Ruff, San Francisco, CA (US); Lauren Combs, Bingham Farms, MI (US)

(73) Assignees: Whitmor, Inc., Southaven, MS (US);
NM Franchise Operations, LLC, Southaven, MS (US)

( * ) Notice: Subject to any disclaimer, the term of this patent is extended or adjusted under 35 U.S.C. 154(b) by 186 days.

(21) Appl. No.: 16/781,783

(22) Filed: Feb. 4, 2020

(65) Prior Publication Data
US 2021/0241659 A1 Aug. 5, 2021

(51) Int. Cl.
*G09F 3/20* (2006.01)
*F16M 13/02* (2006.01)

(52) U.S. Cl.
CPC ........... *G09F 3/205* (2013.01); *F16M 13/022* (2013.01)

(58) Field of Classification Search
CPC .......... G09F 3/0295; G09F 3/205; G09F 7/04; G09F 2007/1852; Y10T 24/32; A44D 2203/00

USPC .................. 248/683, 467, 537, 206.5, 309.4
See application file for complete search history.

(56) References Cited

U.S. PATENT DOCUMENTS

| 4,640,032 A | * | 2/1987 | Lewis | ...................... H02G 3/26 174/135 |
| 2015/0221242 A1 | * | 8/2015 | Cable | ........................ G09F 7/04 40/661.01 |

FOREIGN PATENT DOCUMENTS

DE          10309902 A1 *  9/2004   ............... G09F 7/04

* cited by examiner

*Primary Examiner* — Jonathan Liu
*Assistant Examiner* — Rachel Mae Griffith
(74) *Attorney, Agent, or Firm* — Stites & Harbison PLLC; Richard S. Myers, Jr.

(57) ABSTRACT

An identification assembly for an article that includes a base, an identification plate, and a flexible cable, with the base being planar and having a top surface and a bottom surface, and comprising a plurality of magnet retainers, a plurality of corresponding magnets secured by the magnet retainers and protruding vertically from the top surface, a channel extending lengthwise along the top surface, wherein the height of the magnets is greater than the height of the channel; and the identifying plate being planar and comprising a top surface and a bottom surface, wherein the identifying plate is magnetically attracted to the magnets, and wherein the bottom surface is engaging said magnets; and the flexible cable being situated within the channel and extending beyond two sides of the base.

21 Claims, 9 Drawing Sheets

MAGNETIC LABEL IDENTIFICATION PLATE

FIELD OF THE INVENTION

The present invention relates to a nameplate or identification assembly, especially to an identification assembly that can be used in connection with an article such as a container, basket or tote. The identification assembly is mountable on the article.

SUMMARY OF THE INVENTION

Embodiments of the present invention relate to organizational methods. Specifically, embodiment of the present invention include a versatile identification system that allows a consumer to customize and organize items such as storage items.

Thus, one objective of the present invention is to provide a nameplate and identification assembly for a device or an article that has a magnetic base that allows an identification to be releasably coupled thereto. The identification allows a user to have their names, symbols, and/or logos, etc., printed thereon for identification purposes. Also, the present invention allows for a user to permanently or non-permanently write their name or other identification markings on the label. Since the label is releasably attached to the releasable base, the identification plate can be conveniently replaced.

Embodiments of the present invention can be easily attached to or removed from a device such as a basket or tote.

The universal nature of the invention allows the label identification plate to be used on virtually any type of tote, whether the tote is metal or fabric. Additionally, the present invention can be used in connection with plastic, wood, or other popular materials. The present invention can be used with various designs as well, such as wire mesh, wicker, etc.

Personalized markings or inscriptions are advantageous for organizational purposes due to their ability to readily distinguish one individual's belongings from those of others. Also, personalized markings or inscriptions are advantageous to rank or prioritize tasks.

Thus, one object of the present invention is to provide a magnetic nameplate or identification assembly that can be securely placed on a basket, tote, or similar type of organizational device. The magnetic nameplate can be customized to reflect the intention of the user. The label can be permanent or temporary, and completely customizable.

In one aspect of the present invention, the label of the present invention functions as a personalized indicator configured to be removably attached to an article such as a storage tote or basket. The label identification device can include indicia, markings, designs, decorations or the like. In other embodiments, the outer surface of the label identification device is finished in a manner that facilitates erase-ability, similar to a dry erase board.

Other objectives, advantages, and novel features of the invention will become apparent from the following more detailed description when taken in conjunction with the accompanying drawings.

One aspect of the present invention is an identification assembly for an article that includes a base, an identification plate, and a flexible cable. The base is planar and has a top surface, bottom surface, and a plurality of magnet retainers. Magnets are secured by the magnet retainers and protrude vertically from the top surface. The base includes a channel that extends lengthwise along the top surface, with the height of the magnets being greater than the height of the channel. The identifying plate being planar and comprising a top surface and a bottom surface, and is magnetically attracted to and engaged with the magnets. The assembly includes a flexible cable being situated within the channel and extending beyond two sides of the base.

Although the shape of the identification plate can vary, in one embodiment of the present invention, the identification plate is rectangular.

Although the shape of the base can vary, in one embodiment of the present invention, both the base and identification plate are rectangular. In another embodiment, the base and the identification plate have substantially the same, corresponding size and/or shape. In other embodiments, they do not share the same size and/or shape.

Although the number of magnets can vary, in one embodiment of the present invention the base comprises four, five, or six magnet retainers and magnets. In one embodiment, the base is rectangular and comprises 4 magnets, with a general pattern of one magnet per corner of the base.

In one embodiment of the present invention, the identification plate has a finish that permits dry erase marking. In another embodiment, the top surface and the bottom surface have a finish that permits dry erase marking.

Although the base may be constructed from a variety of materials, in one embodiment of the present invention, the base is metallic. In another embodiment, both the base and the identification plate are metallic.

In one embodiment of the invention, the identification plate is of a multi-layer construction, with at least one layer being metallic to provide magnetic attraction to the base. In one embodiment, the identification plate comprises a metallic layer and at least one plastic layer.

In one embodiment of the present invention, the channel includes a channel plate portion that is flush with the top surface of the base.

Although the cable can be constructed from a variety of materials, in one embodiment of the present invention, the flexible cable is a bendable wire. In another embodiment of the invention, the bendable wire is an interior portion and the exterior is a durable rubber.

Another embodiment of the invention is a storage bin that comprises a floor and four walls. An identification assembly of the present invention is attached to a wall of the bin.

Another embodiment of the present invention is a storage bin that comprises a floor and four walls, with the identification assembly of the present invention attached to a wall of the bin, further comprising a flexible support cable threaded through the channel and threaded through the wall to support the assembly on the wall of the storage bin.

Another embodiment of the present invention is a storage bin that comprises a floor and four walls, with the identification assembly of the present invention attached to a wall of the bin, with the wall of the bin sandwiched between the base and the identification plate. In this embodiment, the identification plate is held on the outside of the wall by magnetic attraction to the base, which is on the inside of the wall.

Another embodiment of the present invention is a storage bin that comprises a floor and four walls, wherein the wall has openings, and the base is situated on the inside of the wall, the magnets are situated within the openings, and the identification plate is on the outside of the wall. One example of this embodiment is where the storage bin wall is a wire mesh.

In other embodiments of the present invention, the basket is comprised of wood, metal, cloth, plastic, or a combination of thereof.

BRIEF DESCRIPTION OF THE FIGURES

It should be understood that the drawings are provided for the purpose of illustration only and are not intended to be construed as defining the limits of the invention. The foregoing and other objects and advantages of the embodiments described herein will become apparent with reference to the following and detailed description when taken in conjunction with the accompanying drawings.

DESCRIPTION OF THE INVENTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein. It should be noted that references to "an" or "one" embodiment in this disclosure are not necessarily to the same embodiment, and such references mean at least one.

Figure 1:
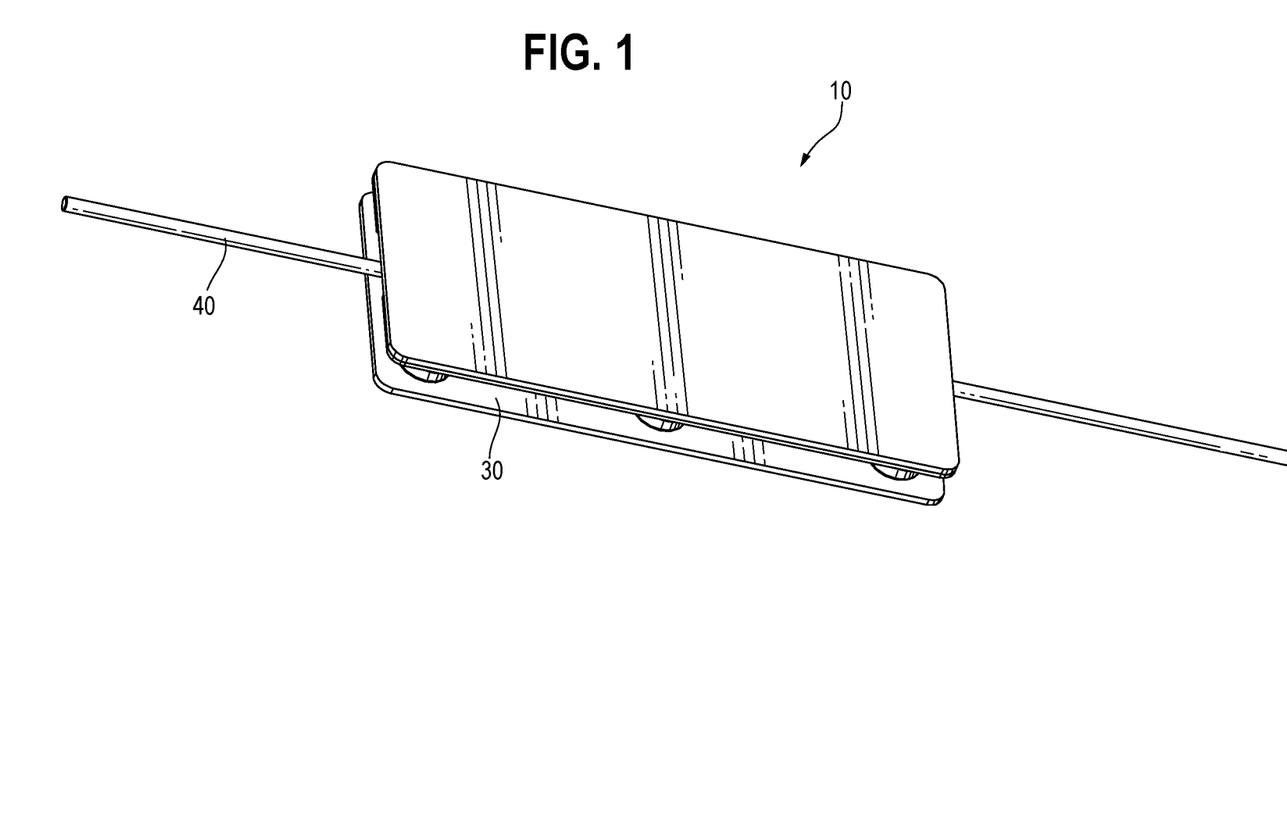
FIG. 1 is a perspective view of an embodiment of the present invention. The identification plate, base, and support cable are shown. The base and the identification plate are releasably attached.

Turning now to the figures, FIG. 1 shows a perspective view of an embodiment of the assembly 10 of the present invention. The top, identification plate/top plate 20 is shown attached to the releasable base 30. Between the identification plate/top plate 20 and the releasable base 30 is the support cable 40. In this embodiment, the identification plate 20 is rectangular. However, the shape is not limited to the shape shown in the drawings. Multiple shapes, sizes, and configurations are contemplated and are within the scope of the invention. For example, the identification plate 20 can resemble a name card. The identification plate 20 may be oval, circular, or have a fanciful design. Additionally, the identification can include indicia, markings, designs, decorations, personalized inscriptions, logos, initials, numbers, instructions, etc.

Also, the design may be more utilitarian. For example, the identification plate 20 may have the shape of numbers or letters. For example, the shape may be a 1, 2, or 3. The shape may also be an A, B, or C. The releasable nature of the identification plate 20 to the base 30 allows the user to readily switch the identification plates 20 as a method of organizing or prioritizing the articles to which the plates are attached. The only limitation is that the identification plate 20 has the ability to connect by magnetic force to the releasable base 30.

Likewise, in the embodiment shown the identification plate 20 is the same size as the releasable base 30, this is not a requirement for other embodiments. Again, the only limitation is that the identification plate 20 has the ability to connect by magnetic force to the releasable base 30. For example, the releasable base 30 may be square shaped and the identification plate 20 may be rectangular. One of ordinary skill in the art would note that there are many workable combinations.

Figure 2:
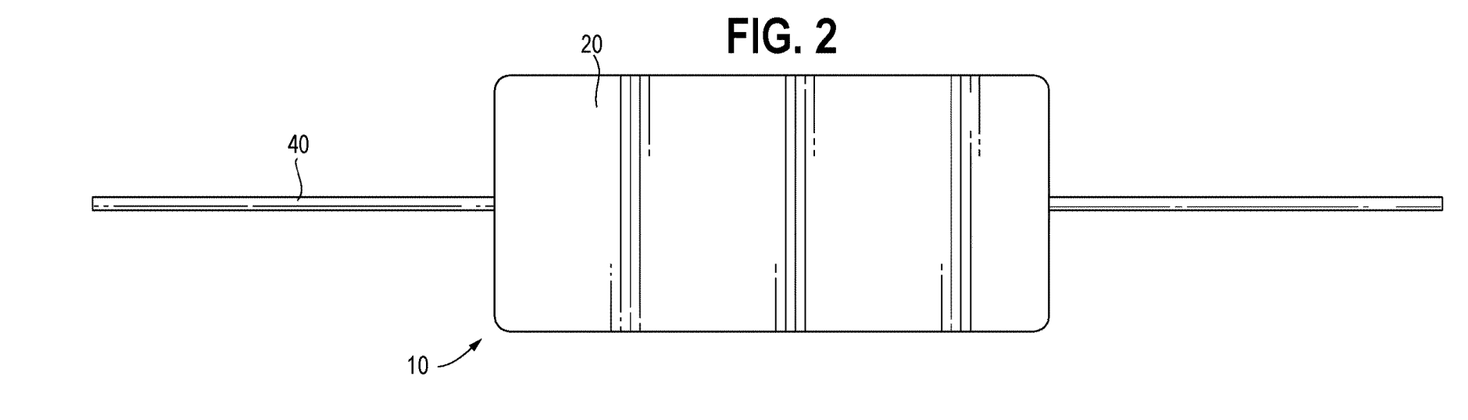
FIG. 2 is a top view of the embodiment shown in FIG. 1. The identification plate and the support cable are shown.

FIG. 2 shows a top view of an embodiment of the present invention. The support cable 40 is passing underneath. As stated above, the identification plate 20 must have the ability to connect by magnetic attraction to the base 30. Thus, the identification plate 20 comprises a magnetic metal. The identification plate 20 may be of unitary construction with magnetic metal, or it may comprise a layer of magnetic metal. There may be a coating or layer, such as a polymeric coating or layer, on the top surface of the identification plate 20. This coating or layer may be of the type to better facilitate identification markings or visible indicia on the upper surface of the identification plate 20. For example, the identification plate 20 may be metal with a layer on top that is capable of dry erase features. In other embodiments, the identification plate may be a type of metal or finished metal that facilitates a dry erase type of indicia to be written in a temporary or semi-permanent fashion. Additionally, a finish or coating may facilitate the easy application and removal of stickers and similar type devices that can be used to provide information or indicia that is displayed on the top surface of the identification plate 20.

Figure 3:
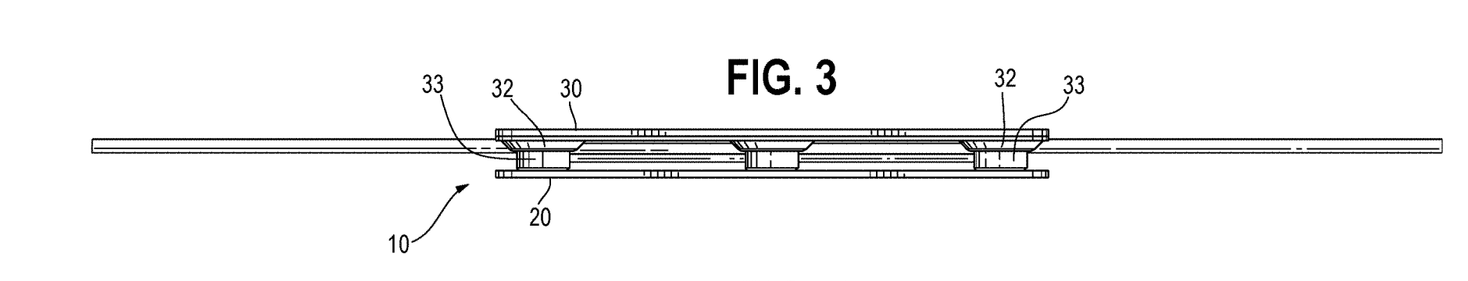
FIG. 3 is a side view of an embodiment of the present invention. The identification plate and the base are shown. Additionally, the magnets and magnet fixtures are shown.

FIG. 3 shows a side view of an embodiment of the present invention. In this view, the identification plate 20 is connected with the base 30 by magnetic attraction. It can be seen that the base 30 has a plurality of protrusions that include a magnet 33 that is coupled with and resting in a magnet footing or magnet retainer 32. The number and arrangement of the magnets 33 is not critical, with the only requirement being that the magnets 33 securely hold the top plate 20 in place while the assembly 10 is resting on a basket, tote, or other device. One of ordinary skill in the art would readily recognize that fewer and stronger magnets 33 may be used to accomplish this task. In general, the magnets 33 are positioned such that movement of the base 30 relative to the plate 20 is restricted.

Figure 4:
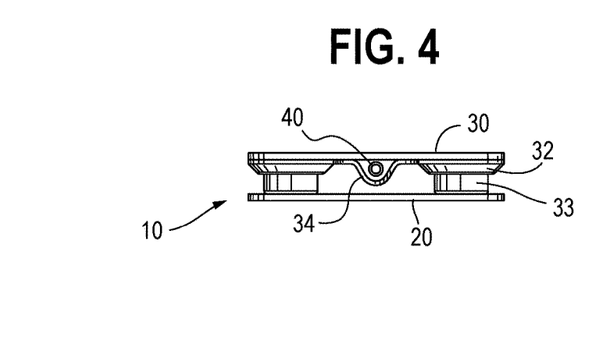
FIG. 4 is an end view of an embodiment of the present invention. This figure shows the support cable, the cable channel, and the magnets. The support cable is in the channel, which is part of the base. The magnets have a height that will allow for clearance of the channel.

FIG. 4 shows a side view of the embodiment depicted in FIG. 3. In this view of the assembly 10, the identification plate 20 is connected with the base 30 by magnetic attraction. It can also be seen in this view that the base 30 has a plurality of protrusions that include a magnet 33 that is coupled with and resting in a magnet footing or magnet retainer 32. In this view, the magnets 33 appear at two corners of identification plate 20. The height of the magnets 33 can vary. In this figure, the height of the magnets 33 is sufficient to provide clearance for the support cable 40 and the support cable channel 34. Preferably the channel 34 is a length that substantially corresponds with the length of the base 30. This allows the device 10 to hang in a level and stable manner when the support cable 40 is in use.

Figure 5:
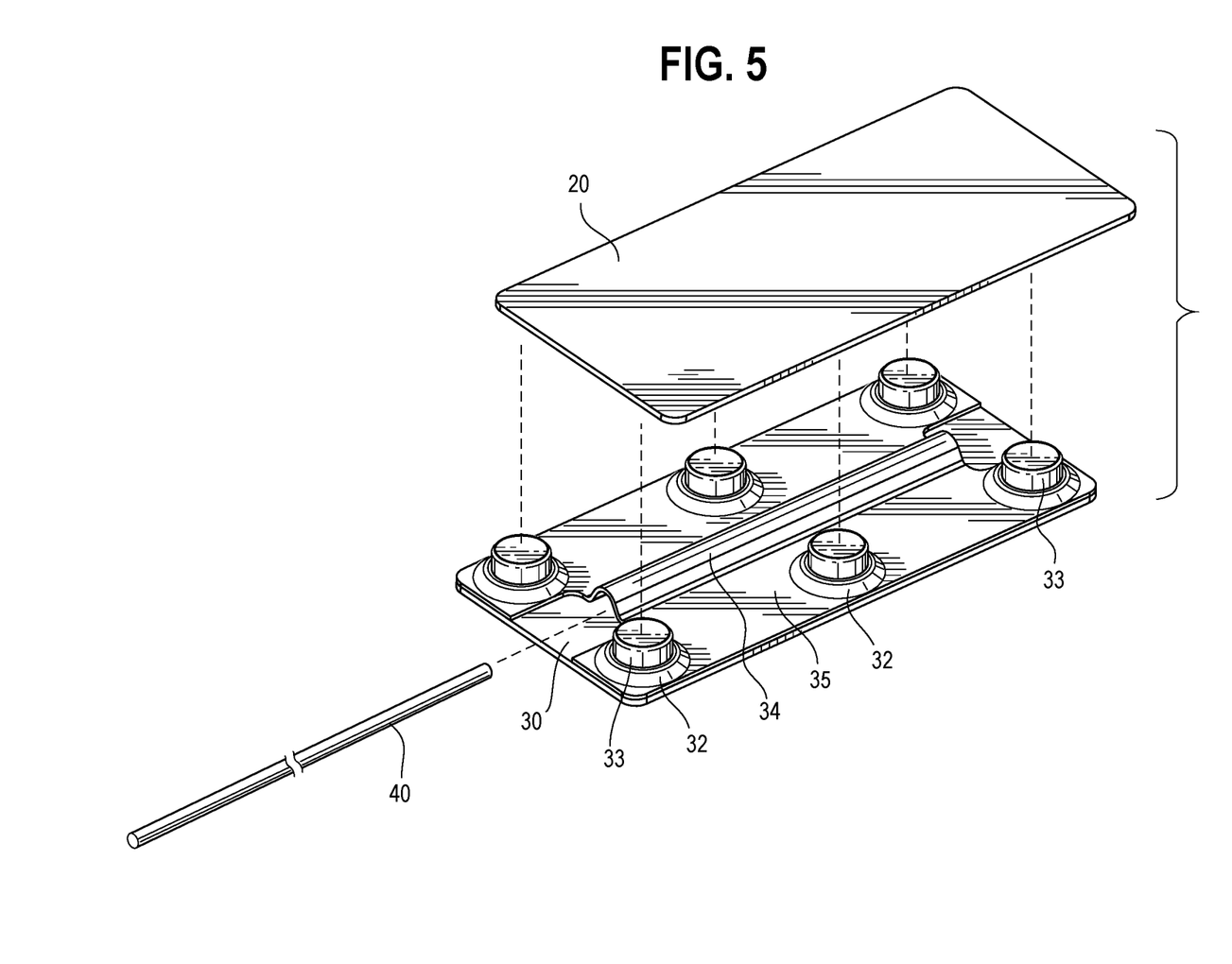
FIG. 5 is an exploded view of an embodiment of the present invention. The arrangement of the magnets on the base can be seen, as well as the support cable channel. The top identification plate is joined with the base by magnetic attraction.

Turning to FIG. 5, an exploded view of an embodiment of the present invention is shown. The identification plate 20 is shown, which will connect with the magnets 33 by magnetic attraction. In this figure, the support cable channel 34 is attached to the base 30. The channel 34 of this embodiment comprises a groove that corresponds with the center of the base 30. The channel 34 is formed from a channel plate 35 that rests on the base 30. The channel plate 35 can be made from a variety of materials, such as a polymeric material (plastic, for example) or metal. As shown, the channel plate 35 generally corresponds in size with the base 30, although that is not required. When the channel plate 35 corresponds in size with the base 30, the magnet retainer 32 and/or the magnet 33 may be attached to the channel plate 35, which is in turn attached to the base 30. The magnets 33 may be attached to the retainer 32 in many ways that would be well understood to one of ordinary skill in the art. Two options are by epoxy, and by the friction created by the retainers 32.

Like the channel plate 35, the magnet retainers 32 and the base 30 may be constructed from a variety of materials, including a polymeric material or metal.

In other embodiments, the channel plate 35 may be attached to the general center of the base 30. In other embodiments, the plate 35 is not required.

In FIG. 5, six magnets 33 are shown. One of ordinary skill in the art would understand that this number can change, as can the arrangement of the magnets 33 on the base 30. This can readily be determined by one of ordinary skill in the art, especially depending on the materials used and the shape of the base 30. The support cable 40 is guided through the channel 34 to support the device, if needed, when the device is mounted on an article.

Figure 6:
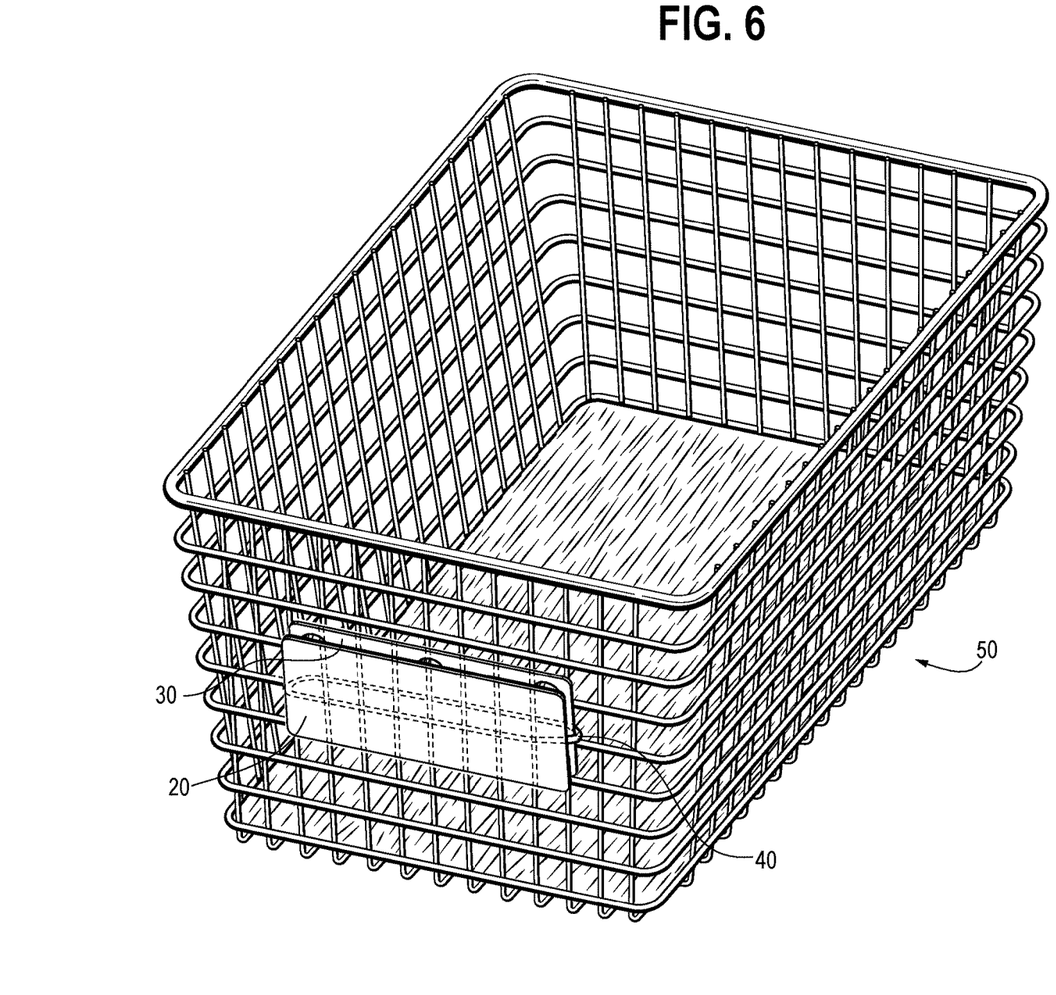
FIG. 6 shows an embodiment of the present invention where the device is affixed to an article, which in this view is a basket. This view is from the outside of the basket.
Figure 7:
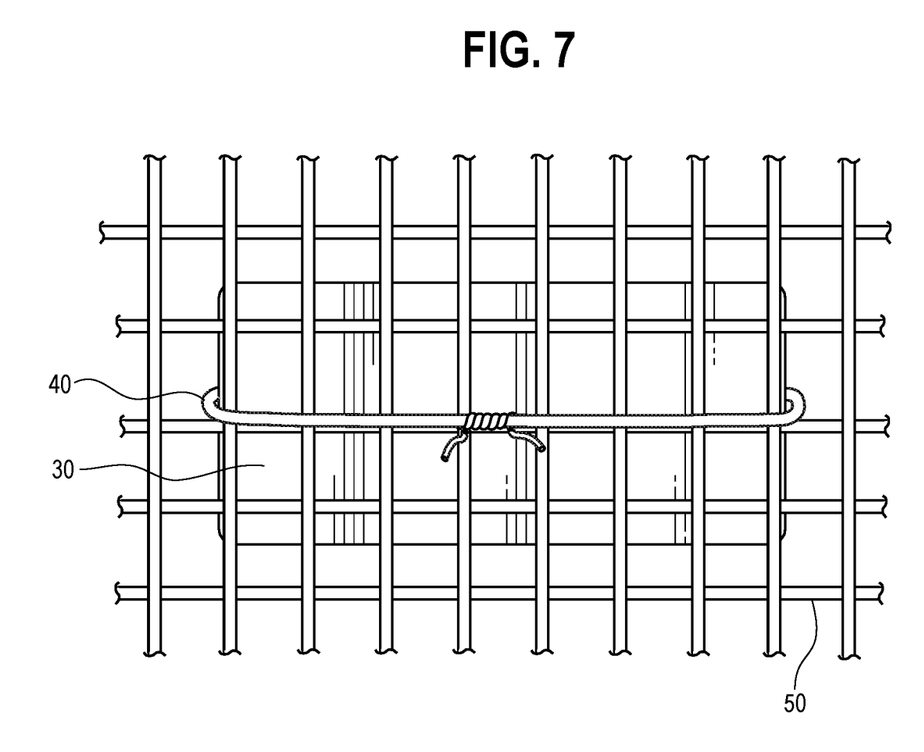
FIG. 7 show an embodiment of the present invention where the device is affixed to an article, which in this view is a basket. This view is from the inside of the basket. The support cable is inserted through the wall of the article and is tied or otherwise affixed in the inside of the article to support the device, which remains on the outside of the container.
Figure 8:
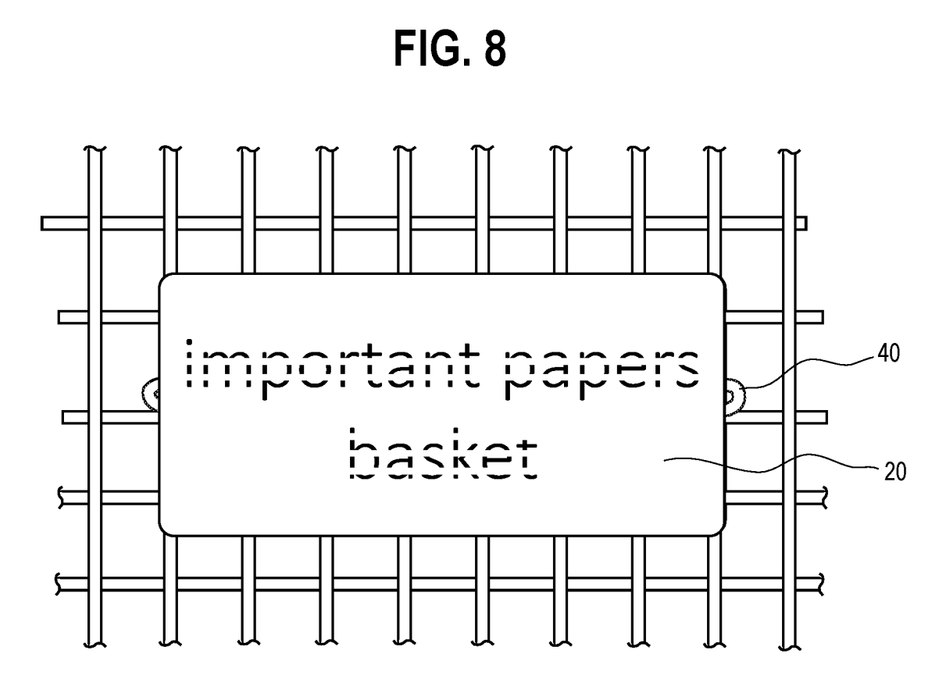
FIG. 8 shows an example of the device of the present invention affixed to an article. This view shows the identification plate with indicia thereon.

FIG. 6 shows the device mounted on an article 50. In the embodiment shown in FIG. 6, the article is a mesh basket. Here, the identification plate 20 is attached to the base 30, and the support cable 40 has been guided through the channel 34. The support cable 40 is in turn guided through the mesh openings in the basket 50 and tied or otherwise fastened on the interior side of the basket 50 to secure the device. This method is typically used for baskets that have readily available openings. Two examples of such baskets are mesh and wicker baskets, which allow for the support cable 40 to be inserted through a wall in the basket. FIG. 7 shows this example with a view from inside the basket. The support cable 40 is through the channel 34, which is in-between the identification plate 20 and the base 30, and through the wall of the mesh basket. FIG. 8 shows this embodiment from a view of in front of the basket. The identification plate 20 and customized indicia are shown.

In other embodiments of the present invention, the identification plate 20 is reversible. That is, both sides may include indicia or a customizable surface. In this embodiment, the plate 20 can be removed from the base 30, and the opposite side be attached to the base 30. This allows one identification plate to convey two messages. For example, one side can display a "to do" message, and the other side can convey a "complete" message, or one side can convey a "high priority" message while the other conveys "low priority."

Figure 9:
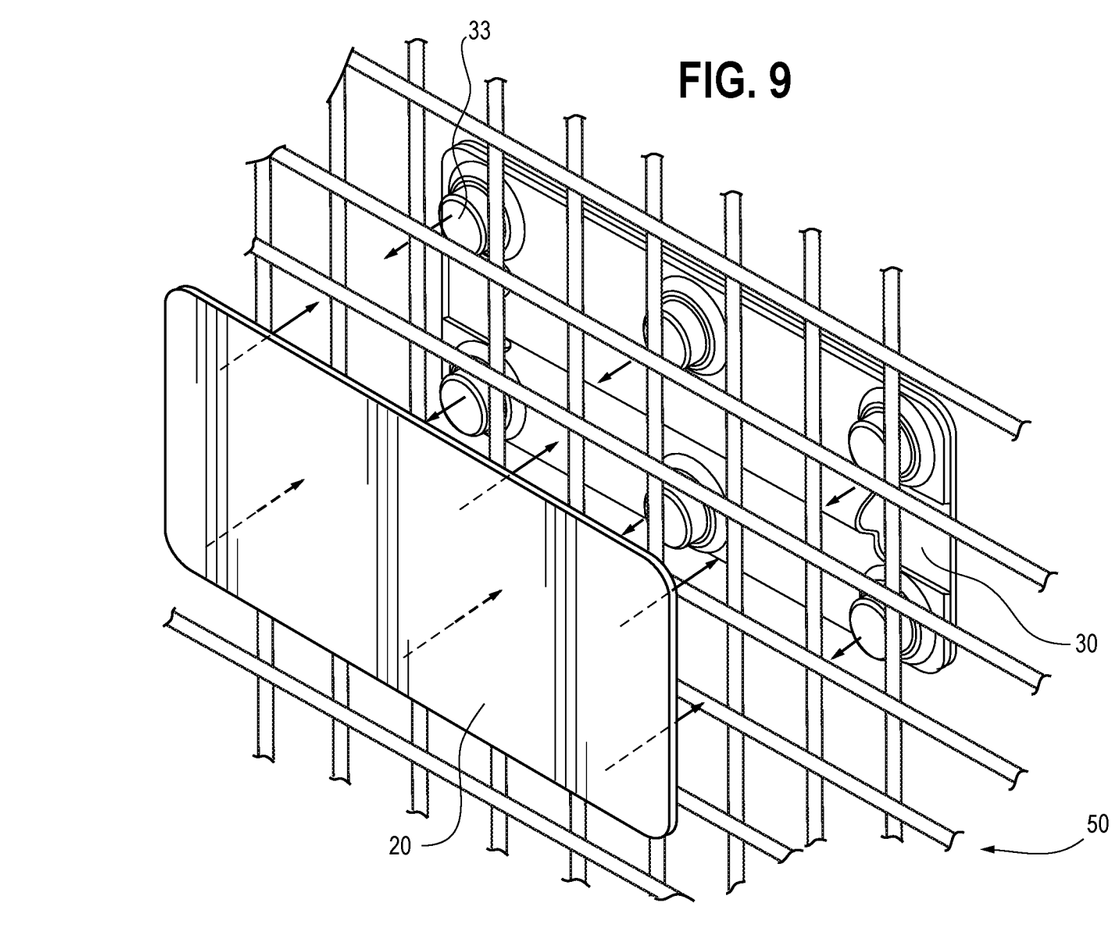
FIG. 9 is an exploded view of an embodiment of the present invention. In this embodiment, the support cable is not required. The base and magnets hold the identification plate either through gaps in the wall of an article, or with the wall of the article in-between the base and the top plate.
Figure 10:
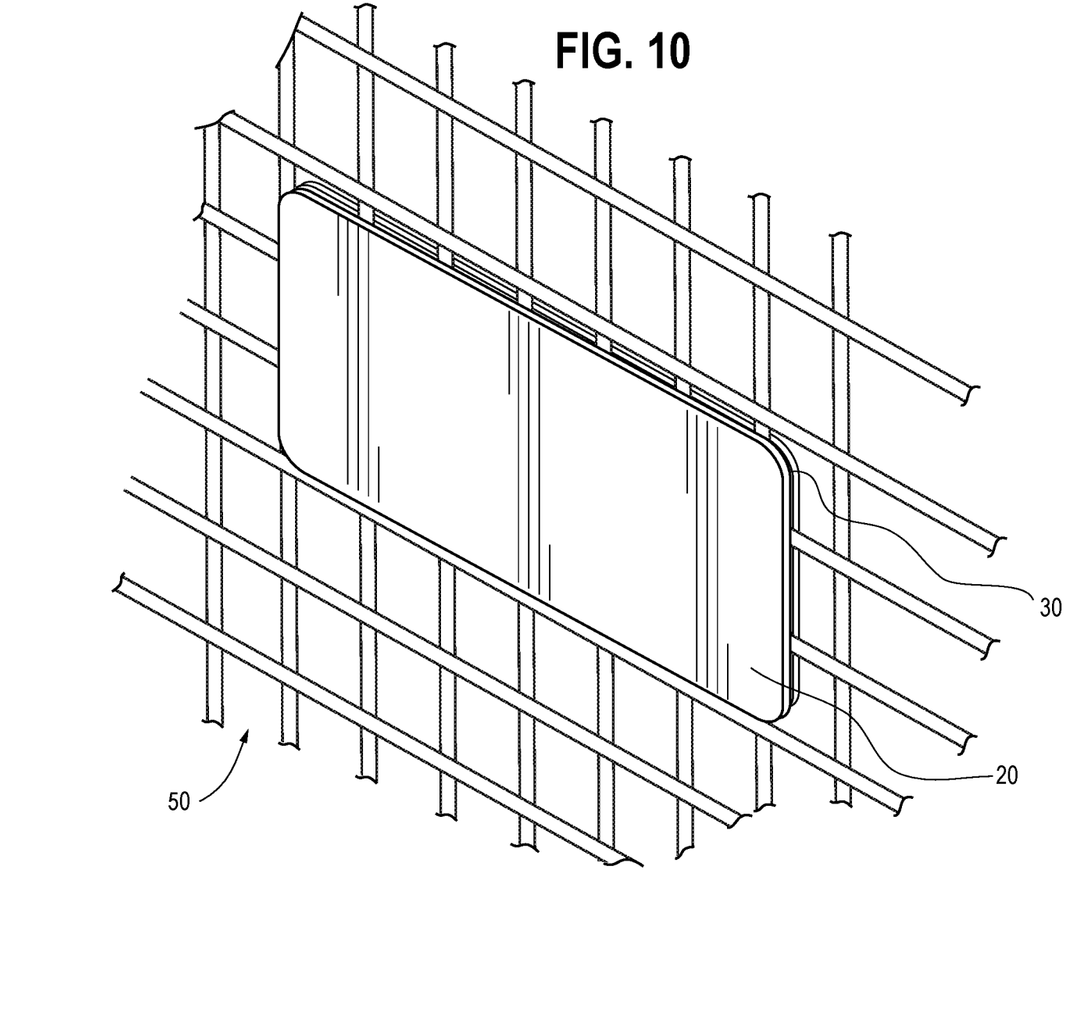
FIG. 10 shows an embodiment of the present invention attached to an article.

In some instances, the basket 50, may be of a mesh material may be thin enough to provide openings that would allow the magnets 33 to engage the plate 20 without the need for the support cable 40. An example of this is shown in FIG. 9. When this is the case, the base 30 can be held inside the basket, and the identification plate 20 can be held outside the basket. The magnets 33 can engage the plate 20 by being placed between the wires of the mesh. Also, in this case, the magnets 33 are of sufficient height to permit contact with the plate 20 through the material that comprises the article wall. FIG. 10 shows this arrangement with the plate 20 engaging the magnets 33 through the wall of the article.

Figure 11:
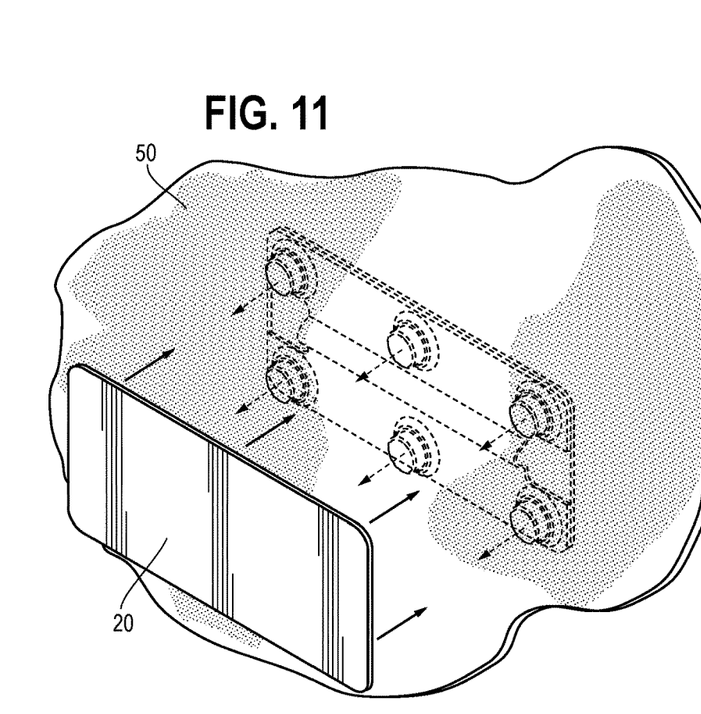
FIG. 11 shows an exploded view of an embodiment of the present invention. This view shows the device of the present invention being attached to an article that has a solid wall. In this embodiment, the support cable is not required.

In other instances, the material of the article is of the nature that the magnets 33 can securely hold the identification plate 20 through the material that comprises the article. For example, the material of the article may be plastic or cloth. See FIGS. 11 and 12 for an example of this instance. In FIG. 11, an article 50 is shown that does not have an opening, such as a mesh or wicker-type opening that would allow the support cable 40 to be inserted through the wall of the article. For this embodiment, the magnetic force between the magnet 33 and the plate 20 is strong enough to overcome the thickness of the article 50 and hold the plate 20 firmly in place. As shown in FIG. 11, in this embodiment, the base 30 is placed on the inside of the article, and is met by the plate 20 on the outside of the article. The base 30 engages the plate 20 with a surface of the article sandwiched in-between. The device is secured by the magnetic attraction between the magnets 33 attached to the base 30 and the plate 20.

Figure 12:
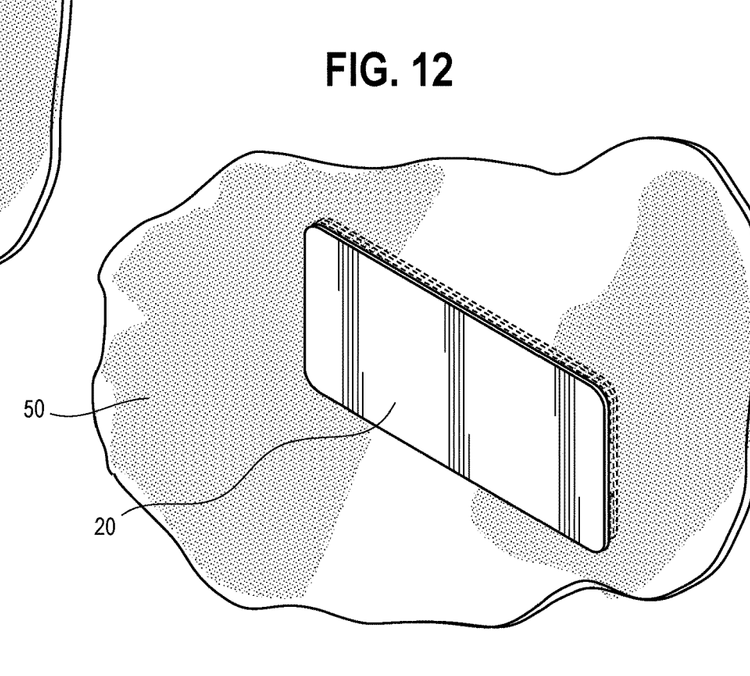
FIG. 12 shows an embodiment of the present invention attached to an article. This article has a solid wall, but it is one that facilitates the magnets engaging and securing the identification plate through the wall.

As shown in FIG. 12, the base 30 is removably attached to the identification plate 20 using magnetic attraction. The magnetic attraction and arrangement of the present invention allow for the device to be affixed and removed from various articles, accessories, etc., and allow for the device to be attached at various places on said articles.

With the embodiments shown in FIGS. 9-12, where the support cable 40 is not required, the base 30 can be constructed without the necessity of the channel 34.

In order to remove or relocate the device 10, a force is simply applied to the identification plate 20 that is strong enough to overcome the magnetic attraction.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

It should also be noted that elements of embodiments may be described in reference to the description of a particular embodiment; however it is disclosed that elements of disclosed embodiments can be switched with corresponding elements of embodiments with the same name and/or number of other disclosed embodiments.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

We claim:

1. An identification assembly for an article, comprising:
a base, a channel plate resting on the base, an identification plate, and a flexible cable;
the base being planar and having a top surface and a bottom surface, and including:
a plurality of magnet retainers;
a plurality of corresponding magnets secured by the magnet retainers and protruding vertically from the top surface,
wherein a channel is formed between the channel plate and the top surface, wherein the height of the magnets is greater than the height of the channel; and
the identification identifying plate being planar and comprising a top surface and a bottom surface, wherein the identification identifying plate is magnetically attracted to the magnets, and wherein the bottom surface is engaging said magnets; and
the flexible cable being situated within the channel and extending beyond two sides of the base.

2. The assembly of claim 1, wherein the identification plate is rectangular.

3. The assembly of claim 1, wherein the base and identification plate are rectangular.

4. The assembly of claim 1, wherein the base comprises 4 magnets.

5. The assembly of claim 1, wherein the base is rectangular and comprises 4 magnets, with a general pattern of one magnet per corner of the base.

6. The assembly of claim 1, wherein the base has 6 magnets.

7. The assembly of claim 1, wherein the identification plate has a finish that permits dry erase marking.

8. The assembly of claim 7, wherein the top surface and the bottom surface have a finish that permits dry erase marking.

9. The assembly of claim 1, wherein the base and the identification plate have a corresponding size and shape.

10. The assembly of claim 1, wherein the base and the identification do not share the same size and shape.

11. The assembly of claim 1, wherein the base and the identification plate are metallic.

12. The assembly of claim 1, wherein the identification plate comprises a metallic layer and a plastic layer.

13. The assembly of claim 1, wherein the flexible cable is a bendable wire.

14. The assembly of claim 13, wherein the bendable wire is an interior portion and the exterior is a durable rubber.

15. A storage bin, comprising:
a floor and four walls;
an identification assembly attached to a wall;
the identification assembly including:
a base, a channel plate resting on the base, an identification plate, and a flexible cable;
the base being planar and having a top surface and a bottom surface, and comprising:
a plurality of magnet retainers;
a plurality of corresponding magnets secured by the magnet retainers and protruding vertically from the top surface,
wherein a channel is formed between the channel plate and the top surface, wherein the height of the magnets is greater than the height of the channel; and
the identification plate being planar and comprising a top surface and a bottom surface, wherein the identifying plate is magnetically attracted to and held by the magnets.

16. The storage bin of claim 15, wherein the identification assembly further comprises a flexible support cable threaded through the channel and threaded through the wall to support the assembly on the wall of the storage bin.

17. The storage bin of claim 15, wherein the wall of the bin is sandwiched between the base and the identification plate, and the identification plate is held on the outside of the wall by magnetic attraction to the base, which is on the inside of the wall.

18. The storage bin of claim 15, wherein the wall has openings, and the base is situated on the inside of the wall, the magnets are situated within the openings, and the identification plate is on the outside of the wall.

19. The storage bin of claim 18, wherein the storage bin wall is a wire mesh.

20. The storage bin of claim 15, wherein the wall of the basket is comprised of wood, metal, cloth, plastic, or a combination of thereof.

21. The storage bin of claim 15, wherein at one surface of the identification plate has a finish that allows for dry-erasable indicia to be printed thereon.

* * * * *